United States Patent [19]
Light et al.

[11] Patent Number: 5,885,673
[45] Date of Patent: Mar. 23, 1999

[54] PEELABLE POUCH-LIKE PACKAGING FOR PHOTOGRAPHIC SHEET FILM

[75] Inventors: Susan L. Light, Webster; Michael Long; Ronald W. Horiszny, both of Rochester; Peter J. Harissis, Rush, all of N.Y.; Donald L. Woodrich, Hoffman Estates, Ill.

[73] Assignee: Eastman Kodak Company, Rochester, N.Y.

[21] Appl. No.: 554,309

[22] Filed: Nov. 8, 1995

Related U.S. Application Data

[63] Continuation of Ser. No. 100,514, Jul. 30, 1993.

[51] Int. Cl.⁶ .......................................................... B32B 1/02
[52] U.S. Cl. ........................ 428/35.4; 428/35.9; 428/36.6; 428/36.7; 383/210; 383/211; 206/455; 206/484
[58] Field of Search ................................. 428/35.2, 35.3, 428/35.4, 35.7, 35.8, 35.9, 36.6, 36.7; 383/210, 211; 206/455, 484

[56] References Cited

U.S. PATENT DOCUMENTS

| | | | |
|---|---|---|---|
| 2,189,174 | 2/1940 | Hohl | 383/210 |
| 2,234,065 | 3/1941 | Vogt | 383/210 |
| 2,528,778 | 11/1950 | Piazze | 206/274 |
| 3,512,632 | 5/1970 | Wiggins | 426/118 |
| 3,734,388 | 5/1973 | Hopkins | 383/210 |
| 4,252,238 | 2/1981 | Spiegelberg et al. | 206/210 |
| 4,337,862 | 7/1982 | Suter | 383/211 |
| 4,705,174 | 11/1987 | Goglio | 383/210 |
| 4,906,517 | 3/1990 | Akao et al. | 428/216 |
| 4,964,515 | 10/1990 | Heyden | 383/210 |

*Primary Examiner*—Shelley A. Dodson
*Assistant Examiner*—Michael A. Williamson
*Attorney, Agent, or Firm*—Susan L. Parulski

[57] ABSTRACT

Packaging material 10 for a sealable, easy opening, tear resistant pouch-like package 100 comprises a first layer 12 including an oriented polymeric material having a front side capable of receiving surface printed information. A second layer 16 bonded to the first layer 12 includes a light barrier and moisture impervious material. Bonded to the second layer is a third layer 18 comprising a a coextruded film comprising carbon black-loaded linear low density polyethylene-EVA-polybutylene or carbon black loaded linear low density polyethylene film with an EVA gel lacquer coating. The material 10 overwraps the photographic product in a pouch-like structure comprising a flap 120, having along its length, a lengthwise seal 123 projecting outwardly of a second side 114. Second side 114 along with a first side 116 of package 100, extend between opposed hermetically sealed rearward and forward end portions 116,118.

19 Claims, 3 Drawing Sheets

PEELABLE POUCH-LIKE PACKAGING FOR PHOTOGRAPHIC SHEET FILM

This is a continuation of application U.S. Ser. No. 08/100,514, filed 30 Jul. 1993.

FIELD OF THE INVENTION

The present invention relates to packaging. More particularly, the invention is concerned with an easy opening, tear resistant, pouch-like package for photographic sheet film.

BACKGROUND OF THE INVENTION

Typically photographic sheet film, utilized for professional commercial photography, is packaged in a protective four-sided hermetically sealed pouch, and the pouch placed in a two or three-part "set-up" box constructed of corrugated, kraft, or chipboard materials. The pouch is generally constructed of an outer layer of paper, a second layer of polyethylene or adhesive, a third layer of aluminum foil, a fourth layer of polyethylene or adhesive, and a fifth layer of polyethylene, this last layer sometimes containing carbon black for additional light-shielding properties. Generally, the pouch structure has minimal oxygen barrier properties and minimal puncture resistance. The paper component typically comprises the bulk of the structure. Since paper has limited strength, it is prone to pin holing and tearing during both the loading of the sheet film into the bag and the loading of the bag into the box. Generally there are either ten or twenty five sheets of square-cut film in a stack, and a paper card (square-cut to the approximate size of the film) on both the top and bottom of the stack. The sharp corners of the film and the cards can slice the laminate material during the packaging operation, and especially during the rigors of the transportation cycle. The tears/pin holes are generally created where the corners of the stack interface with the pouch. Thus a breach of the hermetically sealed pouch is often created. Moisture and dirt can potentially enter these small openings and damage the sensitive film. Such damage may not be discovered until the photographer has taken and developed his pictures. Moreover, damage in the form of abrasions to the emulsion of the film may occur during transport. This latter damage is not related to moisture or dirt but to the individual sheets of film in the stack rubbing against each other during periods of package vibration and shock associated with shipping over long distances. One way to alleviate this problem is to evacuate air out of the pouch prior to the sealing operation. If this evacuation can be maintained during transport, the film stack is effectively immobilized, thereby preventing such abrasion. Experience indicates that an optimal level of air evacuation is required, above which damage will result to the sensitive film emulsion and below which the film will not be secured and immobilized in the pouch. Therefore, conventional pouch materials, made of mostly paper, are not well suited for solving the above problem because of their ability to develop pin holes and tears. Thus, a need exists for a stronger pouch material to ensure product protection during shipping and handling.

A further problem with conventional pouches for photographic sheet film is that the pouch is not reusable. Photographers, on location, often store exposed and unused film inside of the box and discard the opened pouch. Since the user generally physically tears the pouch open it is typically partially destroyed, preventing effective reuse. Storing the film directly in the box only can lead to dirt and moisture contamination of the film. However, if the pouch material were opened in a non-destructive manner and were of sufficient length to fold over one end of the pouch as a flap, the pouch would likely be retained for reuse. Moreover, the film would be more likely to be placed back into the pouch before being inserted in the box. One solution to this reusability problem is to offer extra, unused pouches in the box specifically for this purpose. However, a major shortcoming of this solution is that it adds significant cost and results in additional packaging materials for the solid waste stream. Therefore, a need persists for a stronger pouch material which can be opened easily and in a non-destructive manner to allow package reuse, which is a value-added feature for the photographer.

Yet another problem with conventional pouches for photographic sheet film is the inability to load the sealed, partially-evacuated pouch into the two or three-part set-up box, and to keep the pouch from pushing open the box. The box is generally sized close to the film size, for a tight fit to help minimize product movement/damage during shipping and to minimize packaging material costs. The current paper-based materials exhibit "dead fold" characteristics, i.e., they exhibit memory, such that when folded they tend to retain the fold. The pouch is typically over-sized, to facilitate the loading of the film into the pouch. Therefore the "flaps" of the four-sided sealed pouch must be folded for loading into the box. Given the "dead fold" characteristics of the current materials the pouch tends to load easily and lay down flat in the box tray. Materials with adequate strength to resist tearing tend to be of such stiffness and caliper that when the four-sided pouch is loaded into the box, the four folded flaps resist staying down in the box tray. The pouch tends to protrude above the tray. This can interfere with the assembly of the remaining box part(s), and with the subsequent labeling operation (a label is typically wrapped around the three panels of the box for product identification and to help ensure that the box remains closed). If the pouch is dramatically oversized, such that the four flaps are longer, the flaps tend to stay folded under the pouch better, but the excess material is undesirable from a cost and an environmental standpoint. Also pouch reuse is extremely difficult, as there is so much excess, stiff pouch material to fold and fit into the tight box. The packaging operation is typically manual but this problem would be inherent in either a manual or an automated packaging operation with a stronger pouch material.

Several attempts in various fields of endeavor have been made to address some of the above problems. U.S. Pat. No. 2,189,174 by Hohl teaches a pouch style allowing non-destructive opening, for the dispensing of "flowable" products such as coffee and sugar. Pleats are formed in the pouch, and these pleats act as finger tabs, which the user can grasp to separate the two pouch panels at the seam. Shortcomings of this pouch for solving the problems faced by applicant are that it does not allow for ease of film sheet loading and lacks puncture resistance.

U.S. Pat. No. 4,377,862 by Suter teaches a peel open h-wrap style pouch for vertical form-fill-seal applications, where the package is made in-line, just prior to product filling. The Suter pouch utilizes a paper web which is treated with a composition and coated with an adhesive.

U.S. Pat. No. 4,964,515 by Heyden teaches an easy-open h-wrap style pouch, with a tubular pocket in the seal area for the user to insert a finger. The finger is slid along the remainder of the seal to separate the two layers of pouch material. Shortcomings of this pouch for solving the problems faced by applicant are that it does not allow for ease of film sheet loading, ease of opening and it lacks puncture resistance.

Finally, U.S. Pat. No. 4,705,174 by Goglio teaches a peel open h-wrap style gusseted pouch utilizing a puncture-resistant material. The Goglio invention utilizes a defined strip of peel material, placed adjacent to the pouch opening, and the peel material is a blend of polyethylene and an ionomer.

Therefore, a need persists for a stronger packaging material for sheet film pouches which would eliminate tearing/pinholing. Moreover, there exists a need for a cost efficient, easy opening pouch that would facilitate film sheet loading with both manual and automatic packaging equipment, and would allow an unsealed box to remain closed.

SUMMARY OF THE INVENTION

It is, therefore, the object of the invention to overcome the shortcomings of the prior art. Accordingly, for accomplishing these and other objects of the invention, there is provided, in one aspect of the invention, a package comprising a flexible web material having opposing end edges, the end edges being folded to form a pouch. The pouch-like package comprises first and second sides each extending between opposing rearward and forward end portions. First and second sides of the pouch-like package are hermetically sealed widthwise across the rearward end portion, forming a first widthwise seal. The first and second end edges are joined to form a flap extending outwardly of the second side and they are hermetically sealed lengthwise along a top portion of the flap. The flap is provided with means for expanding the interior of the pouch when photographic sheet film is inserted therein. The forward end portion of the package initially defines a hermetically sealable opening for receiving and subsequently accessing photographic sheet film enclosed in the pouch-like package. Moreover, the forward end portion is provided with means for peelably separating the sealable opening once hermetically sealed.

In another aspect of the invention, a packaging material capable of being sealed and resistant to tearing comprises a first layer having a flexible polymeric material including a front side and a backside capable of receiving printed information. A second layer comprising a light barrier and moisture impervious material bonded to the backside of the first layer is provided. A third layer comprising a coextruded film comprising carbon black-loaded linear low density polyethylene-EVA-polybutylene or carbon black loaded linear low density polyethylene film with an EVA gel lacquer coating, the third layer being bonded to the second layer.

In still another aspect of the invention, a method for packaging a photographic product, comprises providing a package, as described above, having an open sealable end and a first sealed portion formed in an opposed end. The product is then inserted into the interior of the package through the open sealable end. Further, the product is gently urged against the first sealed portion. The interior of the package is then evacuated and the open sealable end is sealed closed.

BRIEF DESCRIPTION OF THE DRAWINGS

The foregoing as well as other objects, features and advantages of this invention will become more apparent from the appended Figures, wherein like reference numerals denote like elements, and wherein.

DETAILED DESCRIPTION OF THE INVENTION

Figure 1:
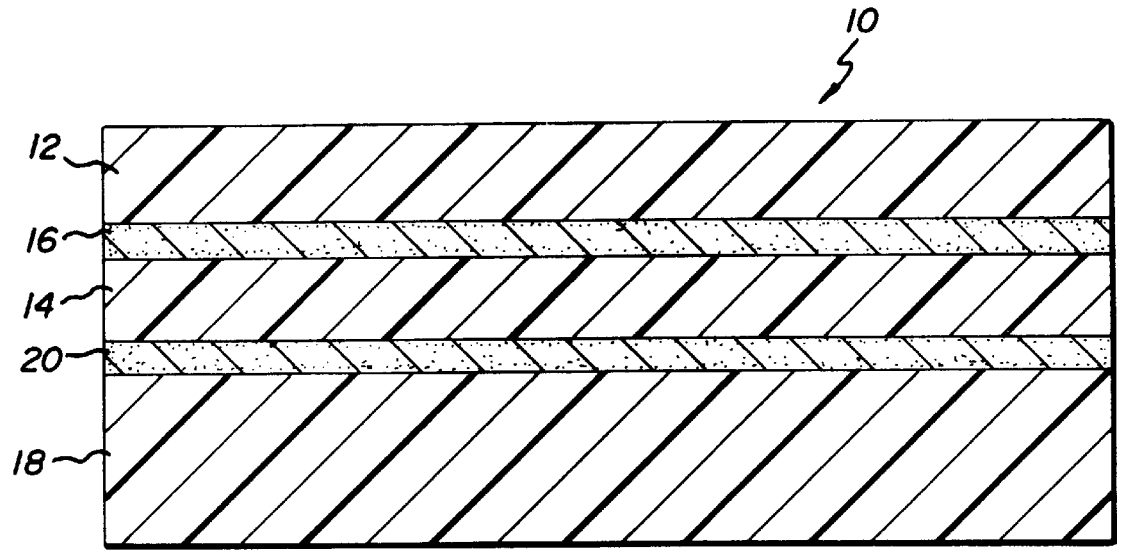
FIG. 1 is a cross sectional view of the material comprising the packaging.

Turning now to the drawings, and more particularly to FIG. 1, the packaging material 10 of the present invention broadly comprises a first layer 12 comprising an oriented polymeric material having a front side and back side each capable of receiving printed information; a second layer 14 comprising a moisture barrier and light imperviousness material; a first adhesive layer 16 for bonding the first layer 12 to the second layer 14; a third layer 18 comprising a coextruded film comprising carbon black-loaded linear low density polyethylene-ethylene vinyl acetate (EVA)-polybutylene or carbon black loaded linear low density polyethylene film with an EVA gel lacquer coating; and, a second adhesive layer 20 for bonding the second layer 14 to the third layer 18.

In the preferred embodiment, packaging material 10 is a puncture resistant laminate comprising a first layer 12 of biaxially or uniaxially oriented polymeric material, preferably biaxially oriented nylon, having a thickness of about 0.00060 inch (0.00152 cm). This material is selected because of its ability to withstand puncturing as described further below. The second layer 14 preferably comprises aluminum foil having a thickness of about 0.00030 inch (0.000762 cm). Layers 12 and 14 are bonded to one another preferably with either a layer 16 of 0.00015 inch (0.000381 cm) thick adhesive or 0.00050 inch (0.00050 cm) thick polyethylene extrusion lamination, both producing substantially identical results. Third layer 18, which provides the peelable characteristic of the package (described below), comprises preferably either 0.00350 inch (0.00889 cm) thick coextruded carbon black-loaded linear low density polyethylene-EVA-polybutylene film or 0.0030 inch (0.00762 cm) carbon black-loaded linear low density polyethylene film with a 0.00010 inch (0.000254 cm) EVA gel lacquer coating. The 0.00350 inch (0.00889 cm) thick coextruded carbon black-loaded linear low density polyethylene-EVA-polybutylene film is most preferred. The EVA gel-lacquer may be applied to the third layer 18 using a gravure process, as a hot melt coating, or as an extrusion coating.

Moreover, the carbon black in the linear low density polyethylene film layer 18 is preferably at least 2% carbon by weight. Second adhesive layer 20 can be selected from the group consisting of 0.00050 inch (0.00127 cm) thick polyethylene extrusion or coextrusion lamination or a 0.00010 inch (0.000254 cm) thick adhesive. Alternative types of adhesives that may be used in first and second layers 16,20 include solventless, solvent, or water-based. Most preferred by the inventors for layer 16 is polyolefin extrusion lamination, preferably low density polyethylene for bonding the first 12 and second 14 layers of flexible web 10. Layer 20 preferably is an adhesive lamination for bonding the second layer 14 to third layer 18.

It should be apparent to those skilled in the art that alternative materials may be used within the contemplation of the invention. First layer 12 of the lamination may alternatively be polypropylene, cellophane, polyethylene terephthyalate (PET) or polyethylene. The foil layer 14 may be replaced by a film such as nylon, polypropylene, PET, or polyethylene which has a thin layer of metal or silica oxide applied to it in a vacuum deposition or plasma coating process. Alternatively, foil layer 14 may be replaced by a layer of polyethylene or ethylene-vinyl acetate copolymer (EVOH), both of which have moisture barrier properties. Moreover, layers 12,14,16 could be replaced by a nylon-EVOH-nylon coextruded film.

It is further within the contemplation of the invention that the caliper (or thickness) of the nylon layer 12 may range from about 0.00060 inch (0.001524 cm) to about 0.0010 inch (0.00254 cm). In one aspect of the invention, layer 16 may be an adhesive lamination having a thickness in the range from about 0.00010 inch (0.000254 cm) to about 0.00040 inch (0.000102 cm). Alternatively, the caliper of layer 16 comprising an extrusion lamination may range from about 0.00020 inch (0.000508 cm) to about 0.00150 inch (0.00381 cm). Aluminum foil layer 14 may have a thickness in the range from about 0.000250 inch (0.000635 cm) to about 0.00150 inch (0.00381 cm). In one aspect of the invention, the caliper of layer 20 comprising an extrusion lamination may be about 0.00020 inch (0.00508 cm) to about 0.00150 inch (0.00381 cm). Alternatively, the caliper of layer 20 comprising an adhesive lamination may have a thickness in the range from about 0.000075 inch (0.0001905 cm) to about 0.0004 inch (0.001016 cm). The caliper of either linear low density polyethylene film 18 may range from about 0.0020 inch (0.00508 cm) to about 0.0050 inch (0.00127 cm). Finally, the EVA gel lacquer coating layer 18 may have a thickness in the range from about 0.000075 inch (0.0001905 cm) to 0.0004 inch (0.0001016 cm).

The preferred nominal overall thickness of the packaging material of the invention is in the range of about 0.00450 inch (0.01143 cm) to about 0.00550 inch (0.01397 cm), but it could range from 0.0030 inch (0.00762 cm) to 0.0080 inch (0.02032 cm).

Further, the pouch material 10 of the invention, as described in detail above, preferably has a minimum penetration resistance of 4,000 grams when subjected to the ASTM F1306-90 "Slow Rate Penetration Resistance test". It is also preferred that the pouch material 10 yield a minimum transmittance optical density of 10 when evaluated on an conventional optical densitometer. Moreover, pouch material 10 preferably has a maximum moisture vapor transmission rate of 0.05 grams/100 square inches/24 hours after 20 cycles of Gelboflex testing, in accordance with ASTM E96 and ASTM 392. Further, pouch material 10 preferably has a maximum oxygen transmission rate of 0.20 cc/square meter/24 hours after 20 cycles of Gelboflex testing, in accordance with ASTM D3985-81 and ASTM 392.

It will be appreciated by those skilled in the packaging materials art that the desired physical characteristics could also be obtained through other combinations of materials as described above.

Figure 2:
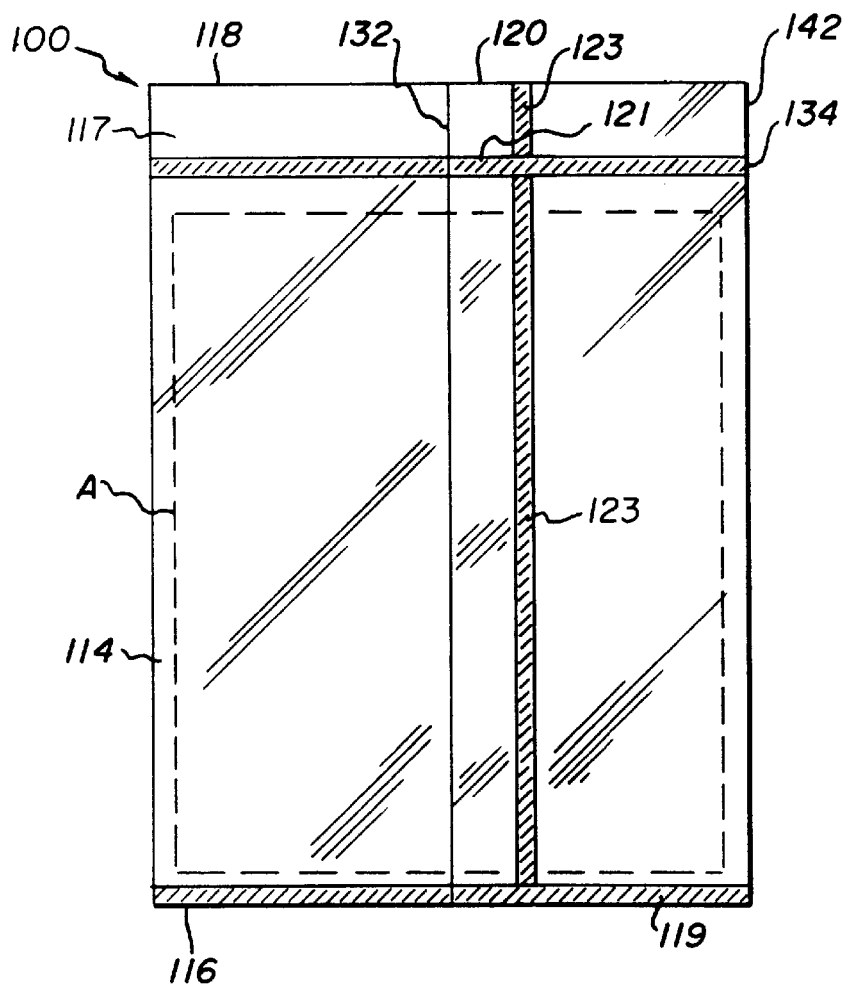
FIG. 2 is a top plan view of the packaging system of the invention.
Figure 3:
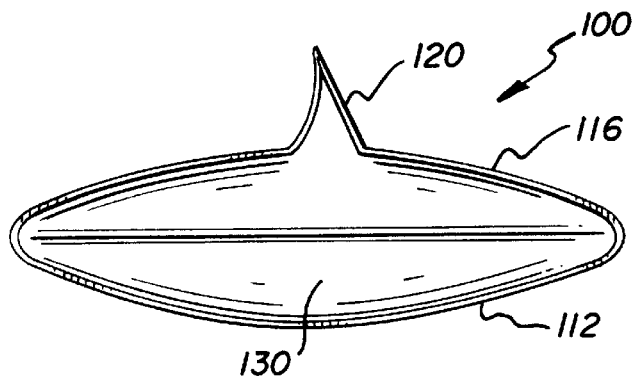
FIG. 3 is an end view of the packaging system showing flap expanded for receiving an article.
Figure 4:
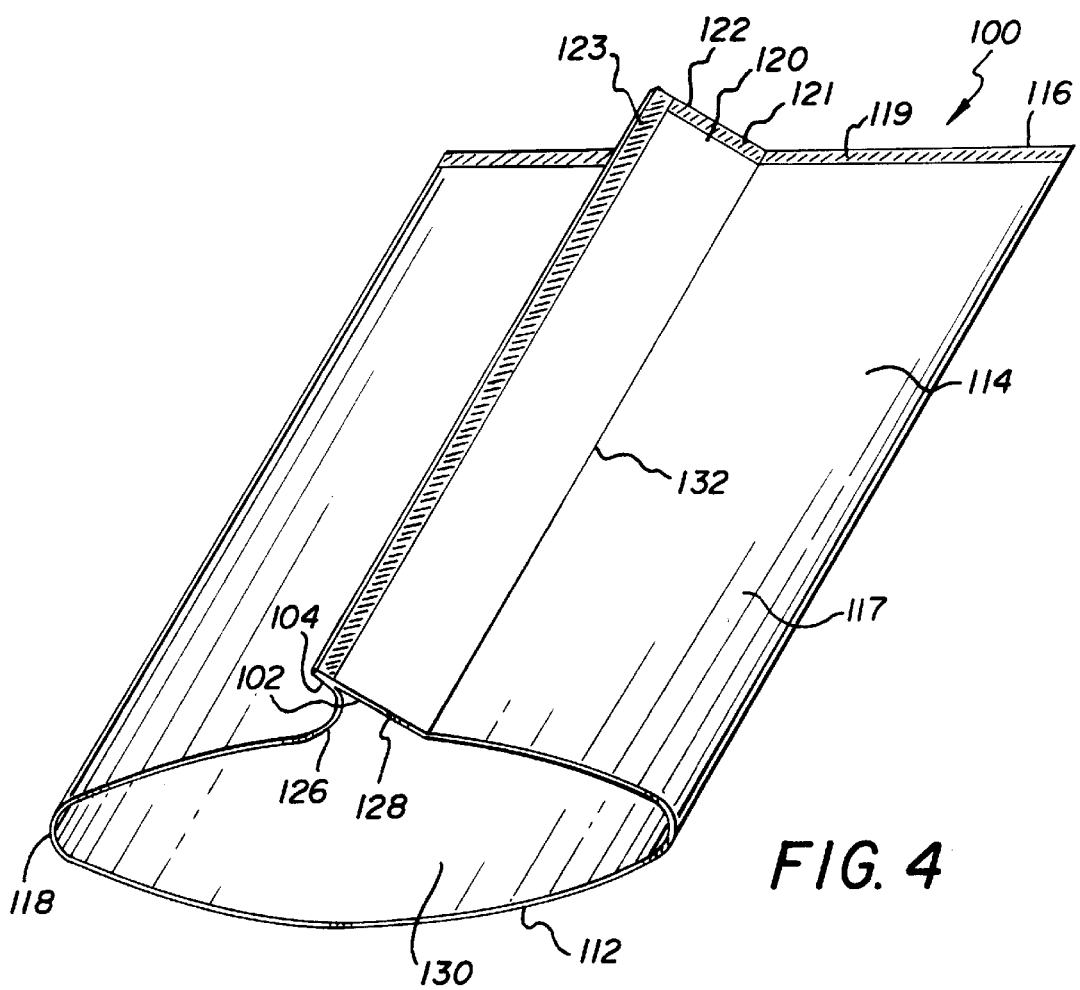
FIG. 4 is a perspective view of the packaging according to the principles of the invention.
Figure 5:
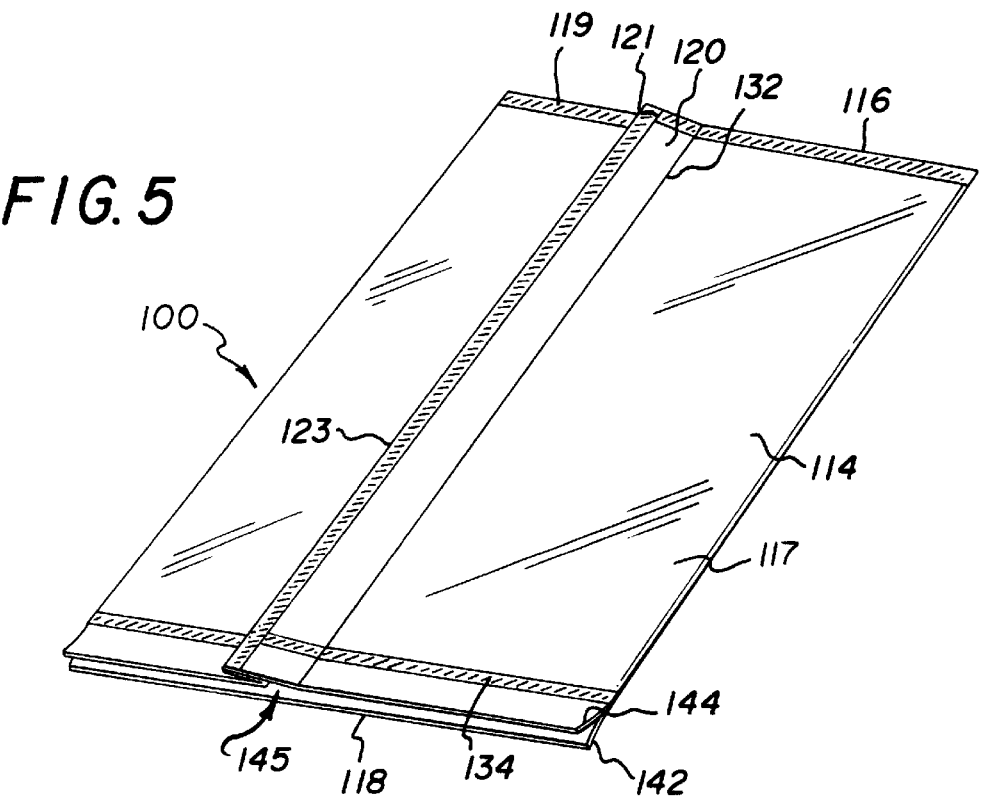
FIG. 5 is a perspective view of the package system.

Turning now to FIGS. 2–6, package 100 of the invention for photographic sheet film (A) is shown having a substantially tubular shape. According to FIG. 4, package 100 is manufactured by folding a sheet of flexible web material 10, having opposed end edges 102,104, to form a pouch-like structure having first and second sides 112,114. In FIGS. 2,4 and 5, first and second sides 112,114 extend between opposing rearward and forward end portions 116,118. Further, first and second sides 112,114 are preferably hermetically sealed widthwise across the rearward end portion 116. Thus, first widthwise seal 119 closes the package 100 at rearward end 116.

According to FIG. 4, opposed end edges 102,104 are joined to form a centrally located flap 120 that extends outwardly of the second side 114. Flap 120 is preferably hermetically sealed lengthwise along a top portion 122 of the flap 120. Lengthwise hermetic seal 123 is sometimes referred to in the field as a finseal. Moreover, flap 120 includes first unsealed flexible material portions 126,128 each extending downwardly from the lengthwise seal 123 to a bottom fold line 132 of the flap at second side 114. When package 100 is open prior to filling as shown in FIG. 4, the space between portions 126, 128 adds volume to the interior 130 of package 100. That is portions 126,128 function as expansion panels and open in a tentwise fashion when product is inserted in the package 100, thereby providing additional clearance for the product (FIGS. 3 & 4). Referring to FIG. 5, the pouch-like package 100 is then pressed flat, with for example a hot press, with the flap 120 and lengthwise seal 123 being folded over flat against second side 114. It is desirable that the fold 132 of the flattened flap 120 be located near the medial portions of the rearward and forward end portions 116,118 (FIG. 2,4 & 5). The resultant flattened package 100 now has a width less than the width of the original flexible web material 10.

Figure 6:
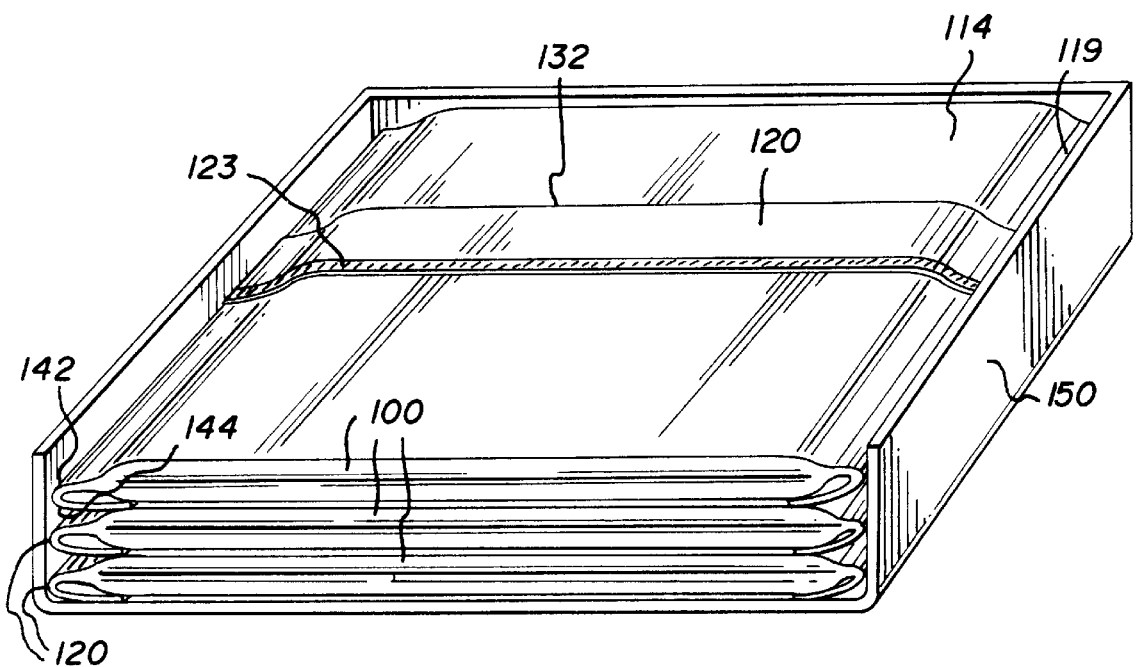
FIG. 6 is a side view of a box tray partially sectioned to expose the packaging stacked therein.

Referring again to FIG. 4, once package 100 has been flattened, a first widthwise hermetic seal 119 is formed across flap 120 and the rearward end portion 116 on the first or second sides 112,114 of package 100. In the process of forming first widthwise seal 119, an end portion 121 of flattened flap 120 is also sealed (FIGS. 5 & 6). The preferred width of the lengthwise seal 123 and first widthwise seal 119 for the package 100 of the invention is 0.250 inch (0.635 cm), but could range from 0.125 inch (0.3175 cm) to 0.500 inch (1.25 cm). While first widthwise seal 119 is preferably located on the outermost edge of rearward end 116, variability in the sealing process may result in some excess material (not shown) extending outwardly from first widthwise seal 119. It is desirable that less than about 0.0625 inch (0.15875 cm) of excess material extend beyond first widthwise seal 119 for compactness and to ensure that the loaded and sealed package 100 will lay flat in its box tray. Pouch-like package 100 is then cut to the desired length to include an open sealable portion 117 formed in the forward end 118, a flap 120 having a lengthwise seal 123 running down the length, and a first widthwise seal 119 on the rearward end 116 (FIG. 4). Further, package 100 is sized substantially to the width of the film, with minimal clearance provided as shown in FIG. 2.

To use the pouch-like package 100, the film sheet (A) is inserted through the open sealable end portion 117 and urged toward the rearward end 116 against the first widthwise seal 119. In FIG. 2, film sheet (A) is positioned in the pouch-like package 100 and abuts first widthwise seal 119, leaving approximately 1.000 inch (2.54 cm) to 3.000 inch (7.62 cm) of second unsealed flexible material portions 142,144 extending to forward end 118. The package 100 is then partially evacuated, using a conventional vacuum device, and the forward end 118 is hermetically sealed approximately 0.500 inch (1.27 cm) to 1.000 inch (2.54 cm) inwardly of the forward end 118. Seal 134 also extends across flap 120.

The strength of each the lengthwise seal 123 and first and second widthwise seals 119,134 is preferably in the range of 2.50 to 3.50 pounds per inch when subjected to the Tappi T517 Dynamic Strength of Flexible Barrier Material Seals test. This level of seal strength provides a strong seal which can withstand the rigors of handling and shipping but does not hamper peelably accessing the film.

As best illustrated in FIGS. 5 & 6, to provide access to interior 130 of package 100 to permit removal of at least a portion of its contents, second unsealed flexible material portions 142,144 are grasped at approximately the center 145 of the forward end 118 while holding onto the lengthwise seal 123. Second unsealed flexible portions 142,144 peel apart easily and cleanly along the second widthwise seal 134, providing full access to the enclosed film (A). Thus package 100 is opened in a non-destructive manner. Moreover, where there is a need to reuse the pouch-like package 100, the user can simply reinsert the film (A) and fold the unsealed flexible material portions 142,144 into the first side 112.

In FIG. 6, a plurality of packages 100 are stacked in a conventional box tray 150 with second unsealed flexible web portions 142,144 conveniently folded into the first side 112. Since the package material of the invention 10 has 'deadfold' characteristics, as described above, the second unsealed flexible material portions 142,144 once folded will unfold only slightly with small products having little mass/weight; but, the package 100, in any case, does not protrude above the box tray 150 and interfere with box closure.

The present invention provides numerous advantageous effects over the prior art. In particular, package 100 affords the user easy and quick access to the product, which is critical given the typical conditions of use and time constraints associated with the photographic profession. The puncture-resistant material 10 resists tearing, and affords a hermetic package 30 which remains substantially air tight after evacuation. This allows the minimization/elimination of product abrasion. Package 100 also affords the advantage of a non-destructive opening, which, in combination with the minimized package size and extended unsealed flexible material portions 142,144, facilitates customer reuse.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangements of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention has therefore been described with reference to certain embodiments thereof, but it will be understood that variations and modifications can be effected within the scope of the invention.

We claim:

1. A package for photographic sheet film, comprising:

a sheet of flexible web material having a first layer comprising a biaxially oriented nylon material, a second layer comprising a light barrier and moisture impervious material bonded thereto, and a third layer comprising a coextruded film having carbon black-loaded linear low density bonded to said second layer, said material having opposed end edges, said end edges being joined to form a pouch having first and second sides each side extending between opposing rearward and forward end portions, said first and second sides being hermetically sealed widthwise by a seal across said rearward end portion to define an interior of said pouch;

said opposed end edges being joined by a lengthwise hermetic seal to form a flap extending outwardly of said second side, said flap including unsealed expansion panels extended from said lengthwise seal to a fold along said second side, said unsealed panels being effective for expanding said interior of said pouch when said photographic sheet film is inserted therein or removed therefrom through said forward end portion; and, said forward end portion initially defining an open sealable portion for receiving and subsequently accessing said photographic sheet film enclosed in said pouch, said forward end portion being provided with means for forming an initially hermetic and subsequently peelable seal across said open sealable portion and unsealed flexible material portions extending outwardly of said peelable seal.

2. A package as recited in claim 1 wherein said flap is folded and flattened along a fold line onto said second side.

3. A package as recited in claim 1 wherein said flexible web material comprises:

a first layer comprising an oriented polymeric material having front and back sides each capable of receiving surface printed information;

a second layer comprising a light barrier and moisture impervious material, said second layer being bonded to said back side of said first layer; and, a third layer comprising a peelable film or coated film layer, said third layer being bonded to said second layer.

4. A package as recited in claim 3 wherein said third layer comprises a coextruded film comprising carbon black-loaded linear low density polyethylene-ethylene vinyl acetate (EVA)-polybutylene.

5. A package as recited in claim 3 wherein said third layer comprises carbon black loaded linear low density polyethylene film with an ethylene vinyl acetate-gel lacquer coating.

6. A package as recited in claim 3 wherein a polyolefin extrusion lamination is provided for bonding said second layer to said first layer.

7. A package as recited in claim 3 wherein said polyolefin extrusion lamination is low density polyethylene.

8. A package as recited in claim 3 wherein an adhesive lamination is provided for bonding said third layer to said second layer.

9. A package as recited in claim 8 wherein said adhesive lamination has a thickness of about 0.00075 inch to about 0.0004 inch.

10. A package as recited in claim 3 wherein said moisture and light barrier layer is aluminum foil.

11. A package as recited in claim 3 wherein said first layer has a thickness in the range of about 0.0006 inch to about 0.001 inch.

12. A package as recited in claim 3 wherein said second layer has a thickness in the range of about 0.000250 inch. to about 0.00150 inch.

13. A package as recited in claim 3 wherein said third layer has a thickness of about 0.0020 inch to about 0.0050 inch.

14. A package as recited in claim 3 wherein said flexible material has a thickness of about 0.00450 inch to about 0.00550 inch.

15. A package as recited in claim 7 wherein said polyolefin extrusion lamination has a thickness of about 0.00020 inch to about 0.0015 inch.

16. A package as recited in claim 3 wherein the flexible material has a penetration resistance of at least 4000 grams.

17. A package as recited in claim 3 wherein the flexible material has a moisture vapor transmission rate of at least 0.05 grams/100 sq. inches/24 hours.

18. A package as recited in claim 3 wherein said seal widthwise across said rearward end portion and said seal lengthwise along said flap each has a seal strength of about 2.5 lbs./inch to about 3.5 lbs./inch.

19. A package as recited in claim 2, wherein said flap includes an end portion flattened to said second side by said widthwise seal.

* * * * *